UNITED STATES PATENT OFFICE.

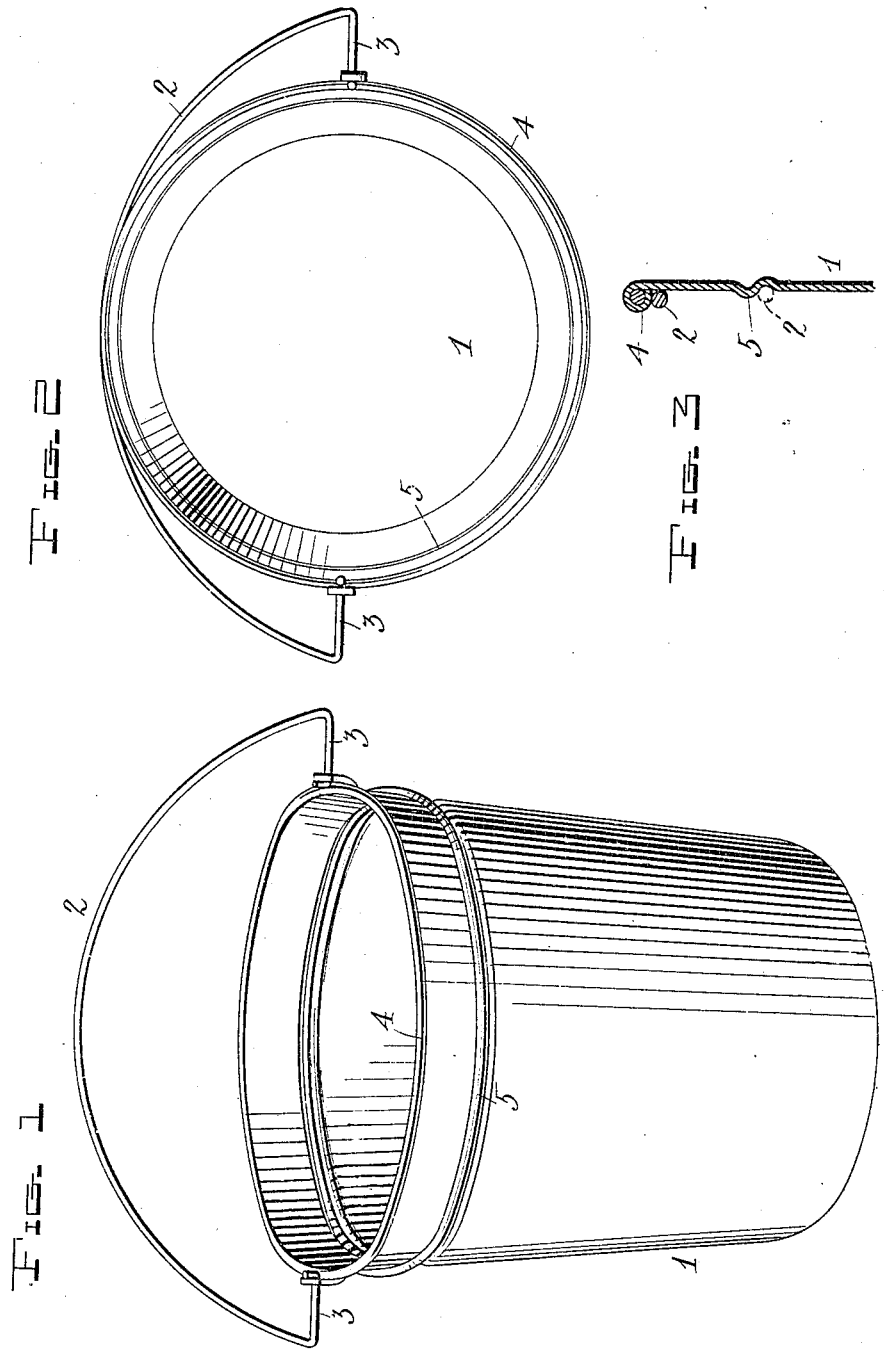

OCTAVE BOITEAU, OF BLOOMER, WISCONSIN.

PAIL-HANDLE.

No. 831,700.

Specification of Letters Patent.

Patented Sept. 25, 1906.

Application filed July 2, 1906. Serial No. 324,446.

*To all whom it may concern:*

Be it known that I, OCTAVE BOITEAU, a citizen of the United States, residing at Bloomer, in the county of Chippewa and State of Wisconsin, have invented certain new and useful Improvements in Pail-Handles; and I do declare the following to be a full, clear, and exact description of the invention, such as will enable others skilled in the art to which it appertains to make and use the same.

My invention is an improved pail and pail-handle, the object of my invention being to effect improvements in the construction of the pail-handle whereby it may be employed to support the pail between the knees when the pail is used as a milking-pail; and my invention consists in the construction and arrangement of devices hereinafter described and claimed.

In the accompanying drawings, Figure 1 is a perspective view of a milk-pail provided with a bail or handle embodying my improvements. Fig. 2 is a top plan view of the same, and Fig. 3 is a detail sectional view of the same.

The pail 1 may be either of the form here shown or of any other suitable form. The bail or handle 2 is curved, of substantially semicircular form, and near its ends is provided with lateral intermediate offset portions 3, the inner ends of which are pivoted to the pail or the ears thereof in the usual manner. Said offset portions 3 of the bail or handle project from opposite sides of the pail and extend radially with reference thereto and are adapted to rest on the knees, so that the pail may be readily supported between the knees when used as a milking-pail. On one side of the pail I provide catches 4 5 of suitable construction, one above the other, to engage the bail when the same is turned down, so as to lock the bail to the pail to enable the bail to support the pail when the latter is in use, as in milking. When the bail is engaged by the lowermost catch, it will support the pail in a slightly-inclined position, as will be understood.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of the invention as defined by the appended claim.

Having thus described my invention, what I claim as new, and desire to secure by Letters Patent, is—

A pail having a bail provided with offset portions which project radially from opposite sides of the pail, and a plurality of means, one above another, to secure the bail when the latter is turned down on one side of the pail.

In testimony whereof I have hereunto set my hand in presence of two subscribing witnesses.

OCTAVE BOITEAU.

Witnesses:
   W. F. HORN,
   BRUCE DODGE.